United States Patent [19]
Masuda

[11] Patent Number: 5,815,746
[45] Date of Patent: Sep. 29, 1998

[54] PARALLAX CORRECTION APPARATUS

[75] Inventor: Hidetoshi Masuda, Yokohama, Japan

[73] Assignee: Canon Kabushiki Kaisha, Tokyo, Japan

[21] Appl. No.: 785,894

[22] Filed: Jan. 21, 1997

[51] Int. Cl.⁶ .................................................. G03B 13/14
[52] U.S. Cl. .............................. 396/81; 396/84; 396/377; 396/149
[58] Field of Search .................................. 396/377, 378, 396/379, 149, 84, 87, 80, 81

[56] References Cited

U.S. PATENT DOCUMENTS 5,216,457  6/1993  Yamaguchi et al. ..................... 396/377
5,604,563  2/1997  Nonaka ..................................... 396/149

Primary Examiner—W. B. Perkey
Attorney, Agent, or Firm—Robin, Blecker & Daley

[57] ABSTRACT

An apparatus, such as a camera, comprises a computing device which computes a parallax correction signal for correcting a parallax of a viewfinder on the basis of a focusing distance and a focal length of an image forming optical system, and a driving device which drives the viewfinder on the basis of the parallax correction signal provided by the computing device.

228 Claims, 10 Drawing Sheets

PARALLAX CORRECTION APPARATUS

BACKGROUND OF THE INVENTION

1. Field of the Invention

This invention relates to a parallax correction device for correcting a parallax of a viewfinder having an optical axis which differs from the optical axis of an image forming optical system.

2. Description of Related Art

The cameras of the kind having a viewfinder using an optical system which differs in optical axis from a photo-taking (image forming) optical system, as in the case of a compact camera, generally have a problem in that a range viewable by the operator of the camera through the viewfinder does not precisely coincide with the range of a picture actually taken on a film surface. This phenomenon is called a parallax. To correct the parallax, various methods have been developed as described in the following.

According to some of known methods, a plurality of field frames are provided for parallax correction within a viewfinder field in such a way as to let the operator approximately know the degree of parallax or to arrange a field mask to be movable according to a photo-taking distance. In the case of a method disclosed in Japanese Patent Publication No. HEI 3-92831, a variable angle prism is disposed in the optical system of a viewfinder and the apex angle of the variable angle prism is varied according to a photo-taking distance so as to perform parallax correction.

In a case where a zoom optical system is used for a photo-taking lens, a zoom optical system is generally used also for a viewfinder in such a way as to zoom the viewfinder in association with the zooming of the photo-taking lens. In such a case, a parallax takes place not only depending on the photo-taking distance but also due to the zooming of the viewfinder optical system. The higher the zoom ratio is, the more this phenomenon becomes conspicuous. In view of this, in Japanese Patent Publication No. HEI 7-86631, there is disclosed a camera, which is arranged to mechanically shift the position of a magnification varying optical system of a viewfinder in association with a change of the focal length of a photo-taking lens.

However, the method for correcting a parallax by mechanically shifting the viewfinder optical system in association with the zooming of the photo-taking lens not only makes the mechanical interlocking arrangement complex but also degrades reliability, increases the number of component parts and increase the size of the viewfinder. Further, since the parallax is not corrected according to the photo-taking distance, the problem of parallax correction still remains unsolved for photographing at a near distance and at a far distance.

BRIEF SUMMARY OF THE INVENTION

In accordance with one aspect of this invention, there is provided an apparatus, such as a camera, which comprises a computing device which computes a parallax correction signal for correcting a parallax of a viewfinder on the basis of a focusing distance and a focal length of an image forming optical system, and a driving device which drives the viewfinder on the basis of the parallax correction signal provided by the computing device, so that the parallax of the viewfinder can be corrected in a most apposite manner taking into consideration the focusing distance and the focal length of the image forming optical system, without necessitating any complex structural arrangement of the apparatus.

The above and other aspects and features of this invention will become apparent from the following detailed description of embodiments thereof taken in connection with the accompanying drawings.

DETAILED DESCRIPTION OF THE INVENTION

Preferred embodiments of this invention are described in detail below with reference to the drawings.

Figure 1:
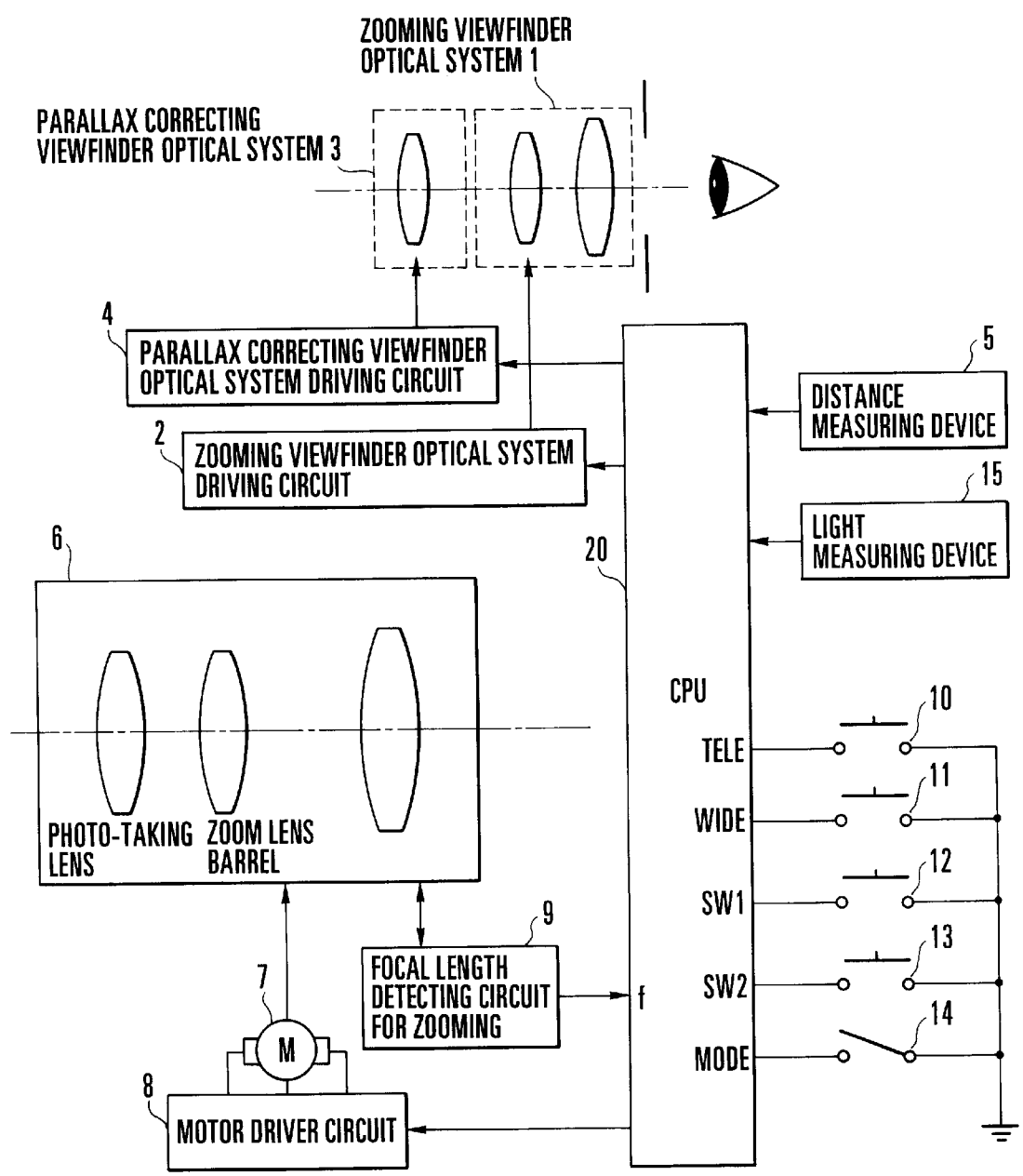
FIG. 1 is a block diagram showing the arrangement of a camera according to a first embodiment of this invention.

FIG. 1 is a block diagram showing the arrangement of a camera according to a first embodiment of this invention. Referring to FIG. 1, a viewfinder optical system 1 which is provided for varying a focal length (hereinafter referred to as zooming) has an optical axis different from the optical axis of a photo-taking optical system. A driving circuit 2 is arranged to drive the zooming viewfinder optical system 1. A viewfinder optical system 3 is provided for parallax correction and is of a so-called shift type. A driving circuit 4 is arranged to drive the parallax correcting viewfinder optical system 3. A distance measuring device 5 is arranged to obtain photo-taking distance information. A photo-taking lens barrel 6 has a zoom lens barrel (a zoom photo-taking optical system). A motor 7 is arranged to drive the photo-taking lens barrel 6. A motor driver circuit 8 is arranged to drive the motor 7. A focal length detecting circuit 9 is arranged to detect and output the focal length of the zoom lens barrel included in the photo-taking lens barrel 6. A telephoto zoom switch 10 is arranged to be used in zooming the zoom lens (barrel) toward a telephoto (TELE) end position. A wide-angle zoom switch 11 is arranged to be used in zooming the zoom lens toward a wide-angle (WIDE) end position. A switch 12 (SW1) is arranged to be turned on by a first stroke of a shutter release button which is not shown. A switch 13 (SW2) is arranged to be turned on by a second stroke of the shutter release button. A photographing mode change-over switch 14 is arranged to effect switching between a normal photographing mode and a quick-shooting photographing mode, which is provided for continuous-shooting photography. A light measuring device 15 is arranged to obtain information on the luminance of a photographed object. A microcomputer 20 (hereinafter referred to as CPU) is arranged to perform central control over these parts.

The actions of the arrangement described above are next described below with reference to FIG. 2 which is a flow chart showing the flow of operation of the CPU 20.

When the telephoto zoom switch 10 or the wide-angle zoom switch 11 is operated by the operator of the camera at a step S101 or S107, the flow of operation of the CPU 20 proceeds to a step S102 or S108. At the step S102 or S108, the CPU 20 makes a check on the basis of the result of detection obtained by the focal length detecting circuit 9 to find if the position of the photo-taking lens barrel 6 is at a telephoto end position or at a wide-angle end position. If not, the flow proceeds to a step S103 or S109. At the step S103 or S109, the motor driver circuit 8 is controlled to drive the photo-taking lens barrel 6 toward the telephoto end position or toward the wide-angle end position. Then, in association with this, the driving circuit 2 is caused to drive the zooming viewfinder optical system 1 toward its telephoto end position or its wide-angle end position. At a step S104 or S110, a check is made through the focal length detecting circuit 9 to find if the photo-taking lens barrel 6 has reached the telephoto end position or the wide-angle end position. If so, the flow proceeds to a step S106 or S112. If not, the flow proceeds to a step S105 or S111. At the step S105 or S111, a check is made to find if the telephoto zoom switch 10 or the wide-angle zoom switch 11 has ceased to be operated and turned off by the operator, with the display of the viewfinder found by the operator to have reached a desired rate of magnification. If so, the flow proceeds to the step S106 or S112, at which the zooming action is immediately brought to a stop.

At the next step S113, a check is made to find if the switch 12 (hereinafter referred to as switch SW1) is turned on by the first stroke of operation performed by the operator on the shutter release button which is not shown. If so, the flow proceeds to a step S114. At the step S114, the CPU 20 first causes the distance measuring device 5 to perform a distance measuring action to obtain photo-taking distance information x. At a step S115, the light measuring device 15 is caused to perform a light measuring action to obtain exposure information.

Figure 3:
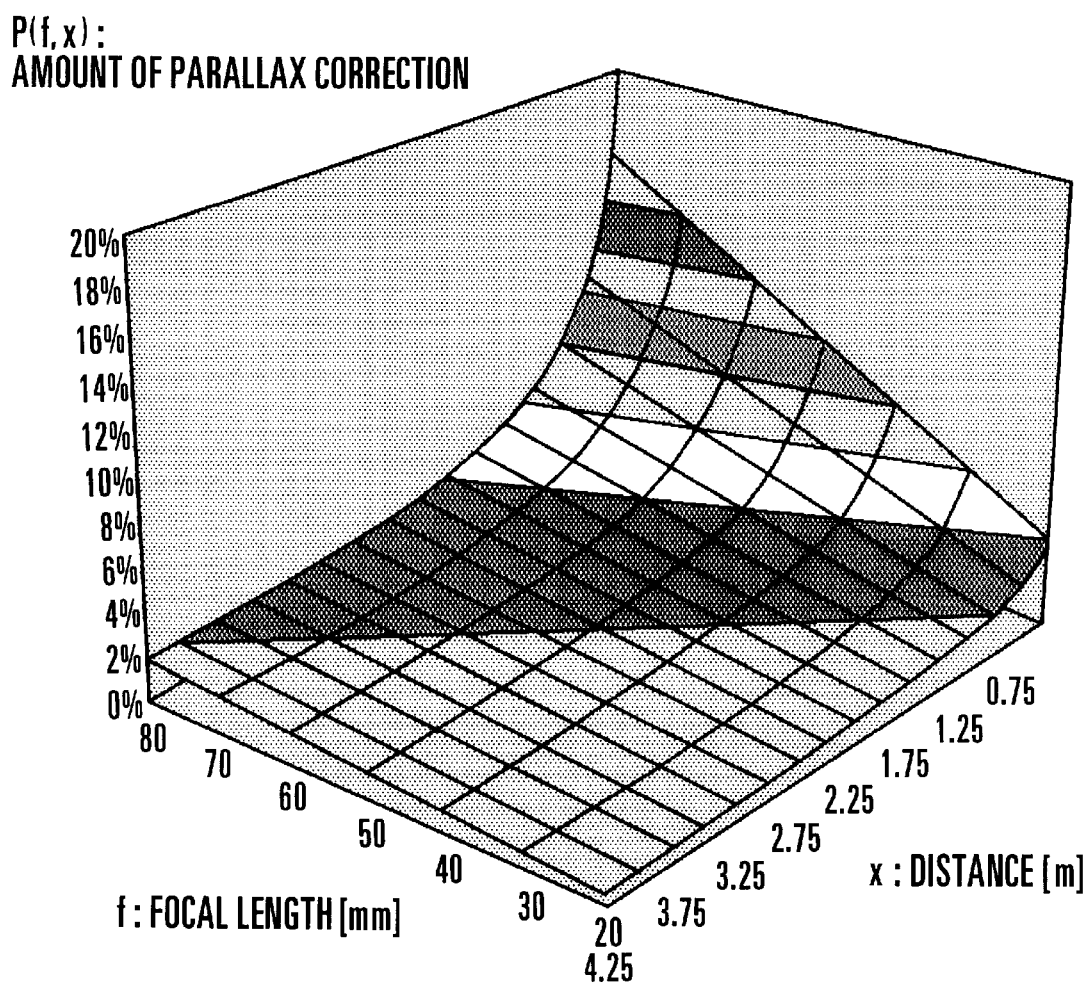
FIG. 3 is a diagram for explaining a parallax correction amount P which is a function of focal length information f and photo-taking distance information x in the first embodiment of this invention.

At a step S116, focal length information f is obtained from the focal length detecting circuit 9. At a step S117, a parallax correction amount P is computed on the basis of the focal length information f and the photo-taking distance information x. In this case, the camera is assumed to have been adjusted to have no parallax at a far distance position on the wide-angle side. The CPU 20 is programmed to obtain a parallax correction amount P(f,x) which is a function of the focal length information f and the photo-taking distance information x. FIG. 3 shows an example of the parallax correction amount P(f,x).

As will be understood from FIG. 3, the parallax correction amount P(f,x) increases accordingly as the focal length f is longer at the same photo-taking distance x, and increases accordingly as the photo-taking distance x is shorter at the same focal length. The parallax correction amount P(f,x) either may be stored beforehand in the form of a table of data at a ROM disposed within the CPU 20 or may be obtained by a computing operation of the CPU 20.

At a step S118, the CPU 20 causes the driving circuit 4 to drive the parallax correcting viewfinder optical system 3 on the basis of the parallax correction amount P(f,x), so as to vary the direction of the visual field of the viewfinder in such a way as to correct a parallax. The driving action is brought to a stop when the position of the parallax correcting viewfinder optical system 3 reaches the parallax correction amount P obtained at the step S117.

As a result, the range of images observable in the viewfinder comes to coincide with that of a picture actually taken after the shutter release button is pushed by the operator to the extent of its first stroke.

Under this condition, when the shutter release button is further pushed by the operator to the extent of the second stroke at a step S119, the switch 13 (hereinafter referred to as switch SW2) is turned on. Then, the flow proceeds to a step S120. At the step S120, the CPU 20 causes a focusing lens to be driven to make focus adjustment on the basis of the photo-taking distance information x. At a step S121, a shutter is controlled for an exposure action on the surface of a film in use on the basis of the above-stated exposure information. The photographing operation then comes to an end. After photographing, the film thus exposed is wound up by a film transport device which is not shown.

As described above, in response to the pushing operation on the shutter release button, the parallax is adequately corrected according to the photo-taking distance information x and the focal length information f of the zoom lens barrel. The parallax thus can be corrected to a nearly constant state.

In the first embodiment described above, the zooming viewfinder optical system and the parallax correcting viewfinder optical system are arranged to be drivable independently of each other. This arrangement gives the following advantage.

Figure 4:
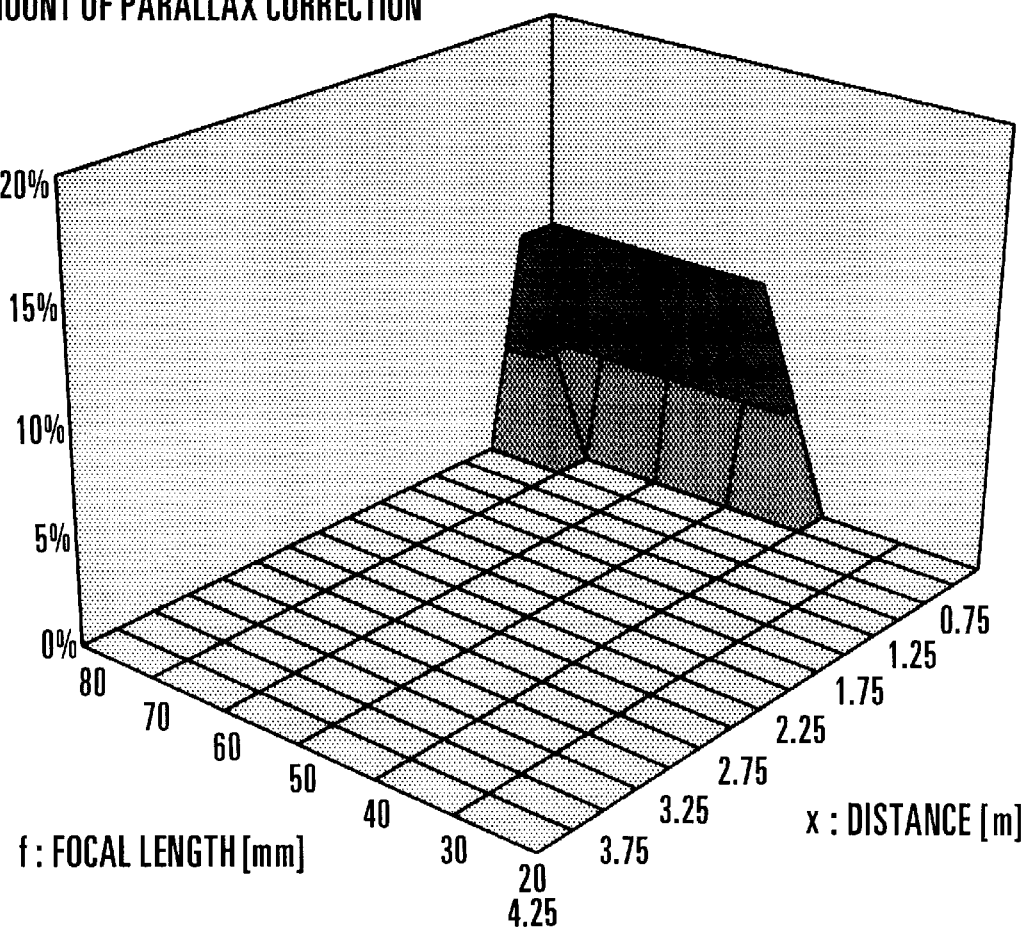
FIG. 4 is a diagram showing the parallax correction amount P in a state of being digitized in units of 10%.

FIG. 4 shows the parallax correction amount P(f,x) shown in FIG. 3 in a state of being digitized in units of 10%. Referring to FIG. 4, an amount of correction is set at "0" in an area where the parallax correction amount P(f,x) would be less than 10%, as such an amount is considered to be negligible. In an area where the parallax correction amount P(f,x) would be not less than 10%, an amount of correction is incremented in units of 10%. With the parallax correction amount arranged in this manner, the parallax correcting viewfinder optical system 3 does not have to be driven for the area where the amount of correction is set at 0%.

In other words, it is not necessary to drive the parallax correcting viewfinder optical system at least in a case where the photo-taking optical system either has its photo-taking distance on the side of far distances or has its focal length on the side of short focal lengths. For example, when the position of the photo-taking optical system is on the side of wide-angle positions where the focal length information f indicates a value less than 40 mm, the parallax correction amount P(f,x) can be set at 0% without recourse to the photo-taking distance information x. In such a case, the parallax correcting viewfinder optical system does not have to be driven. By virtue of this arrangement, a shutter release time lag and the possibility of an unnecessary parallax correcting action can be effectively lessened.

In a case where the shutter release time is desired to be shortened as much as possible, it is preferable to perform no parallax correcting action for any practically negligible parallax as mentioned above. Further, in accordance with this invention, the camera can be easily arranged to perform no parallax correcting action in a case where a photographing action must be done in preference to the parallax correction, as in cases where the camera must follow a moving object in the quick-shooting photographing mode.

Figure 2:
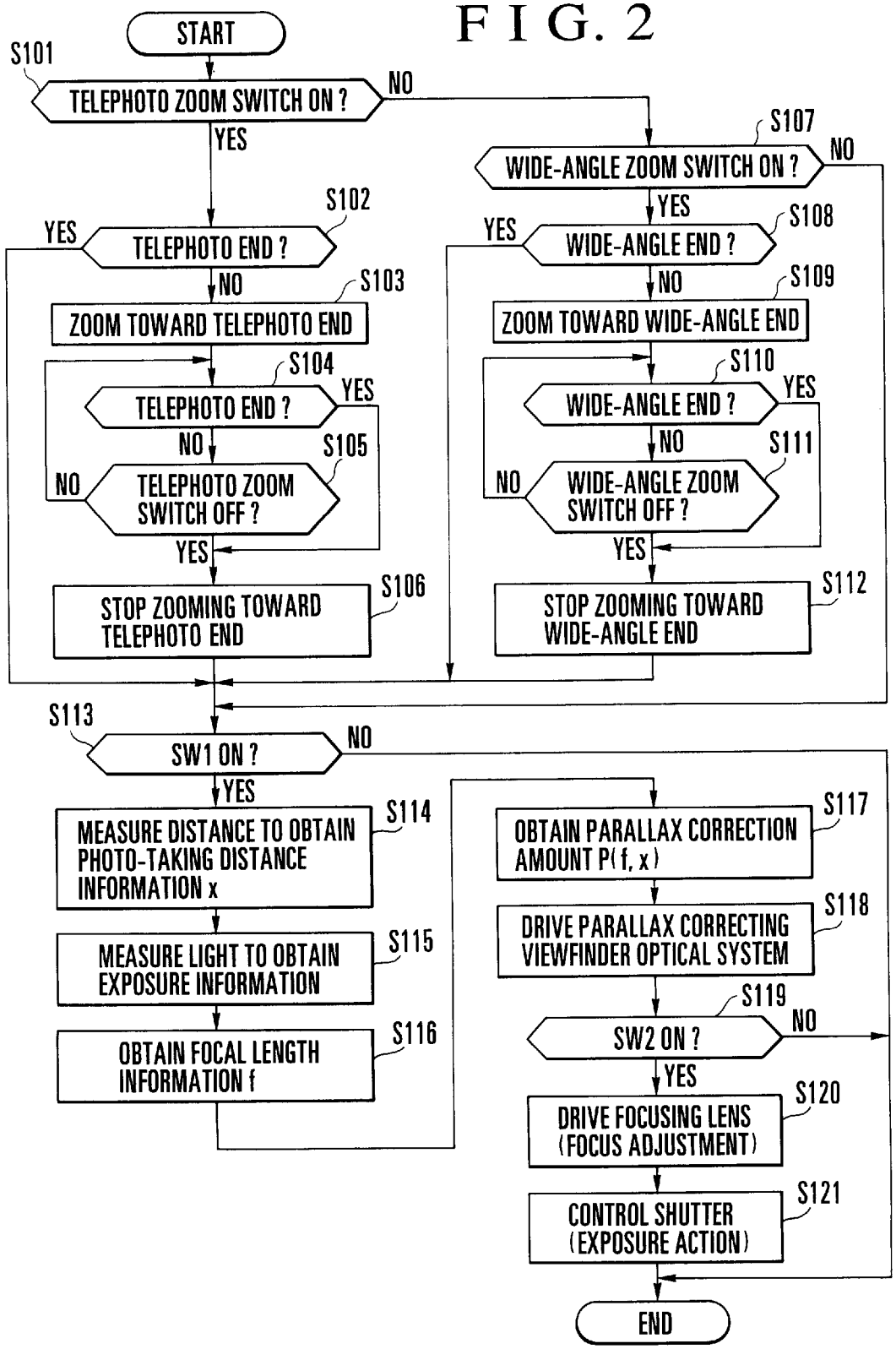
FIG. 2 is a flow chart showing an operation of a microcomputer of the camera shown in FIG. 1.
Figure 5:
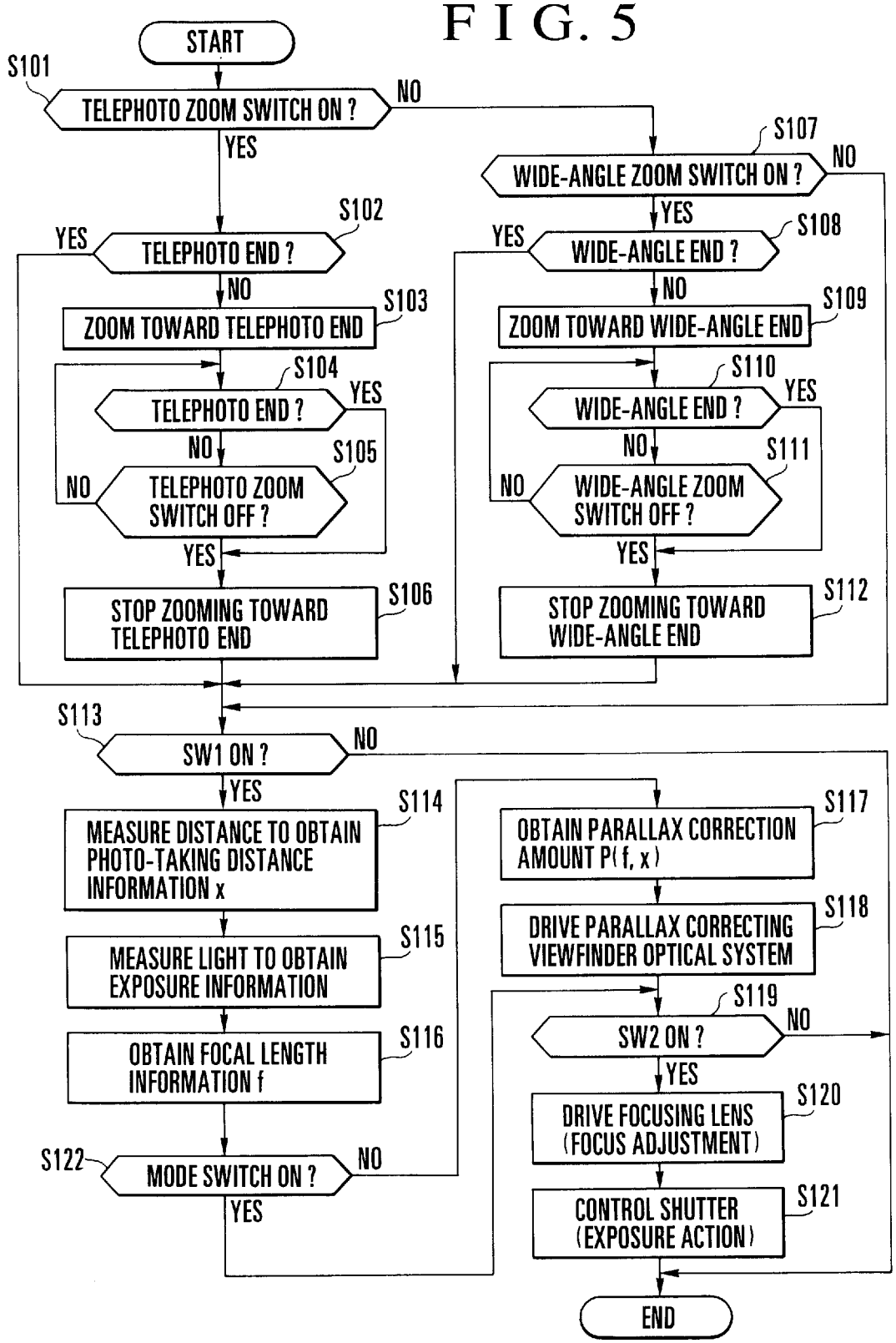
FIG. 5 is a flow chart showing an operation of the microcomputer of the camera shown in FIG. 1 according to a second embodiment of this invention.

FIG. 5 is a flow chart which is a modification of the flow chart of FIG. 2 and shows an operation of the camera according to a second embodiment of this invention. In the case of the second embodiment, when the quick-shooting photographing mode is selected by turning on the photographing mode change-over switch 14, a step S122 is executed. The step S122 is arranged to omit the step S117 of computing the parallax correction amount P and the step S118 of driving the parallax correcting viewfinder optical system 3, so that the shutter release time lag can be shortened in the quick-shooting photographing mode in which a shutter release has priority. In the flow chart of FIG. 5, all steps other than the step S122 are the same as those of FIG. 2 and have the same step numbers as in the case of FIG. 2. The steps other than the step S122 are, therefore, omitted from description.

Figure 6:
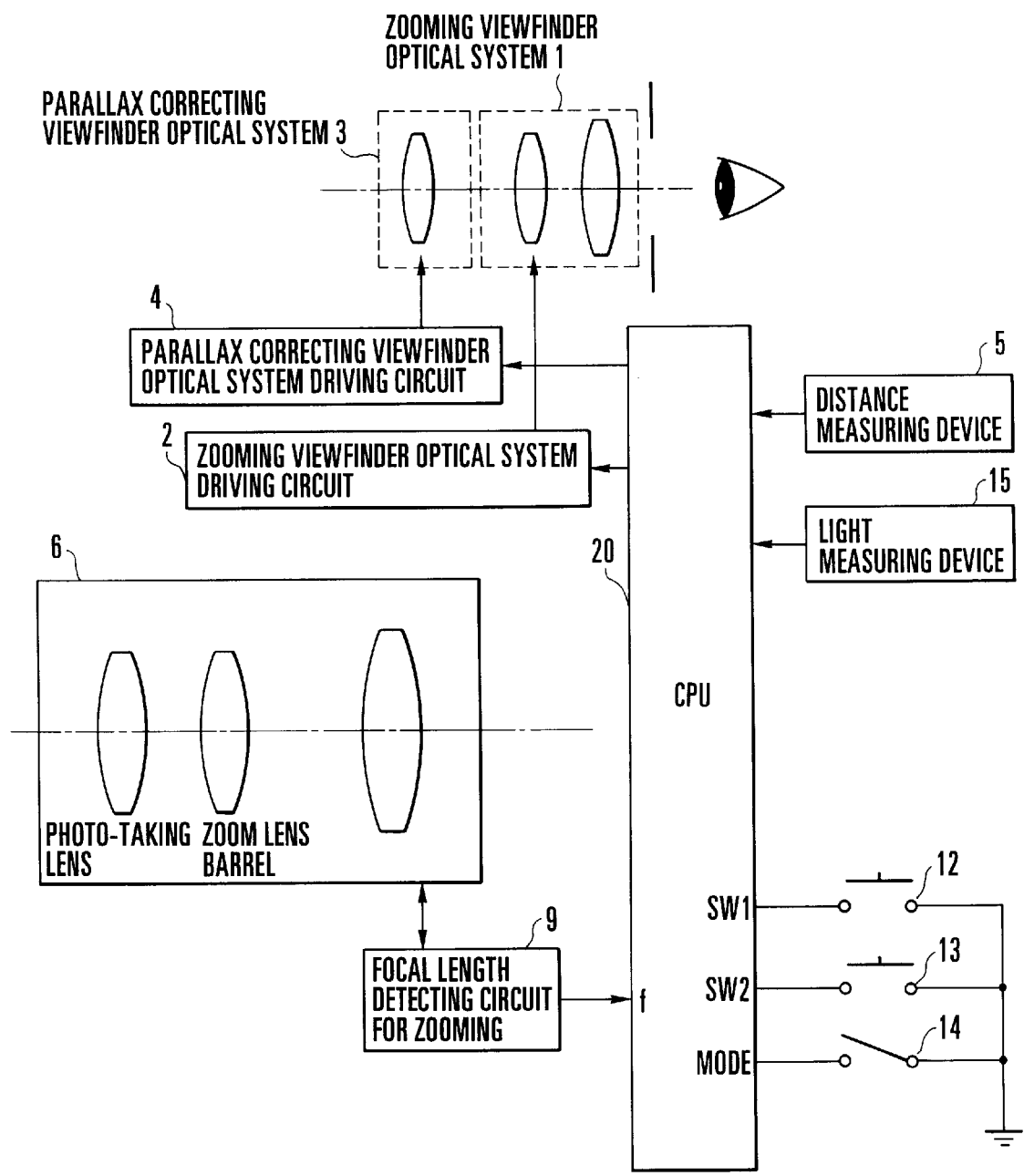
FIG. 6 is a block diagram showing the arrangement of a camera according to a third embodiment of this invention.

FIG. 6 is a block diagram showing the arrangement of a camera according to a third embodiment of this invention. In FIG. 6, parts that are the same as those of FIG. 1 are indicated by the same reference numerals as in FIG. 1.

The third embodiment differs from the first embodiment in the following points. The zoom motor 7 and the telephoto zoom switch 10 and the wide-angle zoom switch 11 which are provided for zooming in the first embodiment are omitted. In the third embodiment, the photo-taking lens barrel 6 is arranged to be manually operated for zooming.

Figure 7:
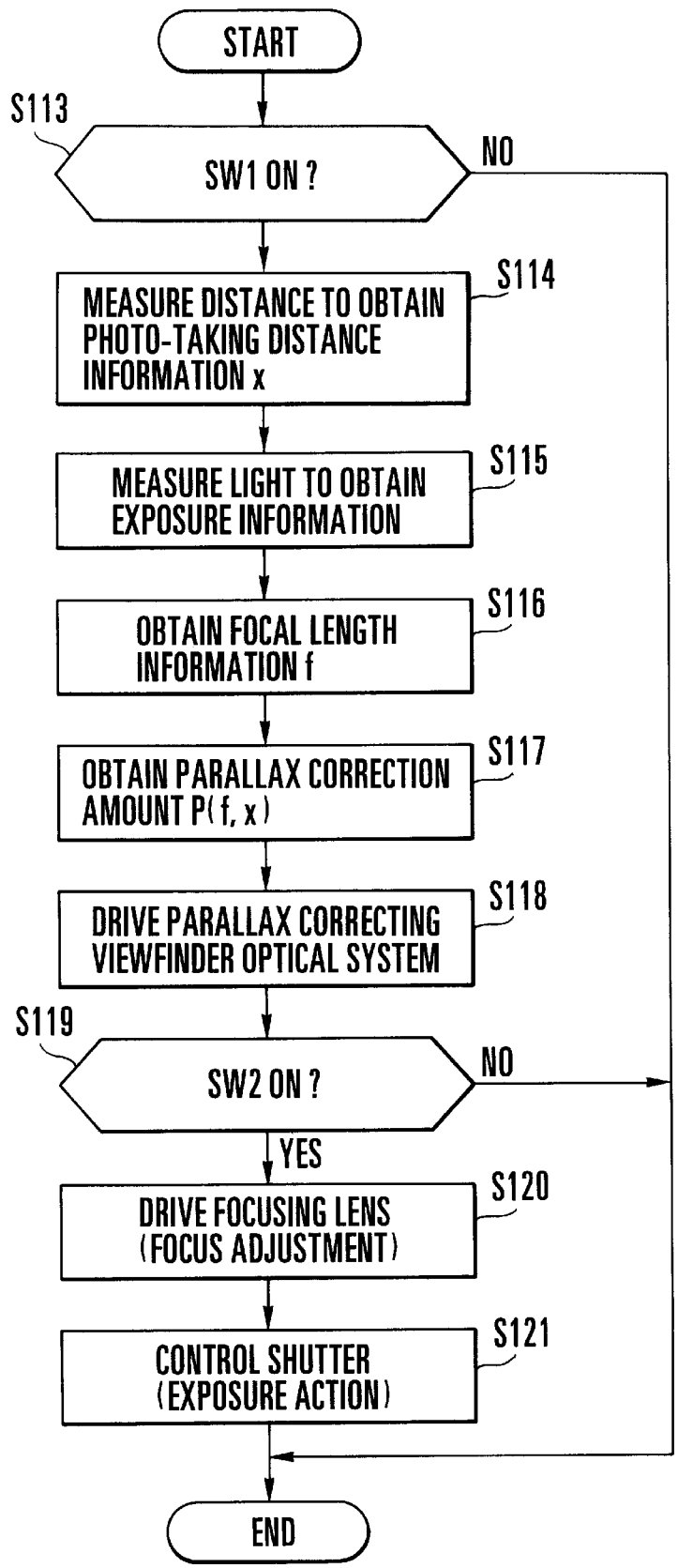
FIG. 7 is a flow chart showing an operation of a microcomputer of the camera shown in FIG. 6.

The third embodiment arranged in this manner operates as described below with reference to FIG. 7 which is a flow chart showing an operation of the CPU 20. In FIG. 7, all steps that are the same as those of FIG. 2 are indicated by the same step numbers as in FIG. 2.

At a step S113, when the shutter release button which is not shown is pushed by the operator to the extent of the first stroke, the switch SW1 is turned on. The flow of operation then proceeds to a step S114. At the step S114, the CPU 20 causes the distance measuring device 5 to perform a distance measuring action to obtain the photo-taking distance information x. At a step S115, the light measuring device is caused to perform a light measuring action to obtain exposure information. At a step S116, the focal length information f of the photo-taking lens barrel 6 is obtained from the focal length detecting circuit 9. The flow then proceeds to a step S117.

At the step S117, a parallax correction amount P is computed and obtained on the basis of the focal length information f and the photo-taking distance information x in the same manner as in the first embodiment. At a step S118, the CPU 20 causes the driving circuit 4 to drive the parallax correcting viewfinder optical system 3 on the basis of the parallax correction amount P(f,x). The driving action is brought to a stop when the position of the parallax correcting viewfinder optical system 3 reaches the above-stated parallax correction amount P.

Figure 8:
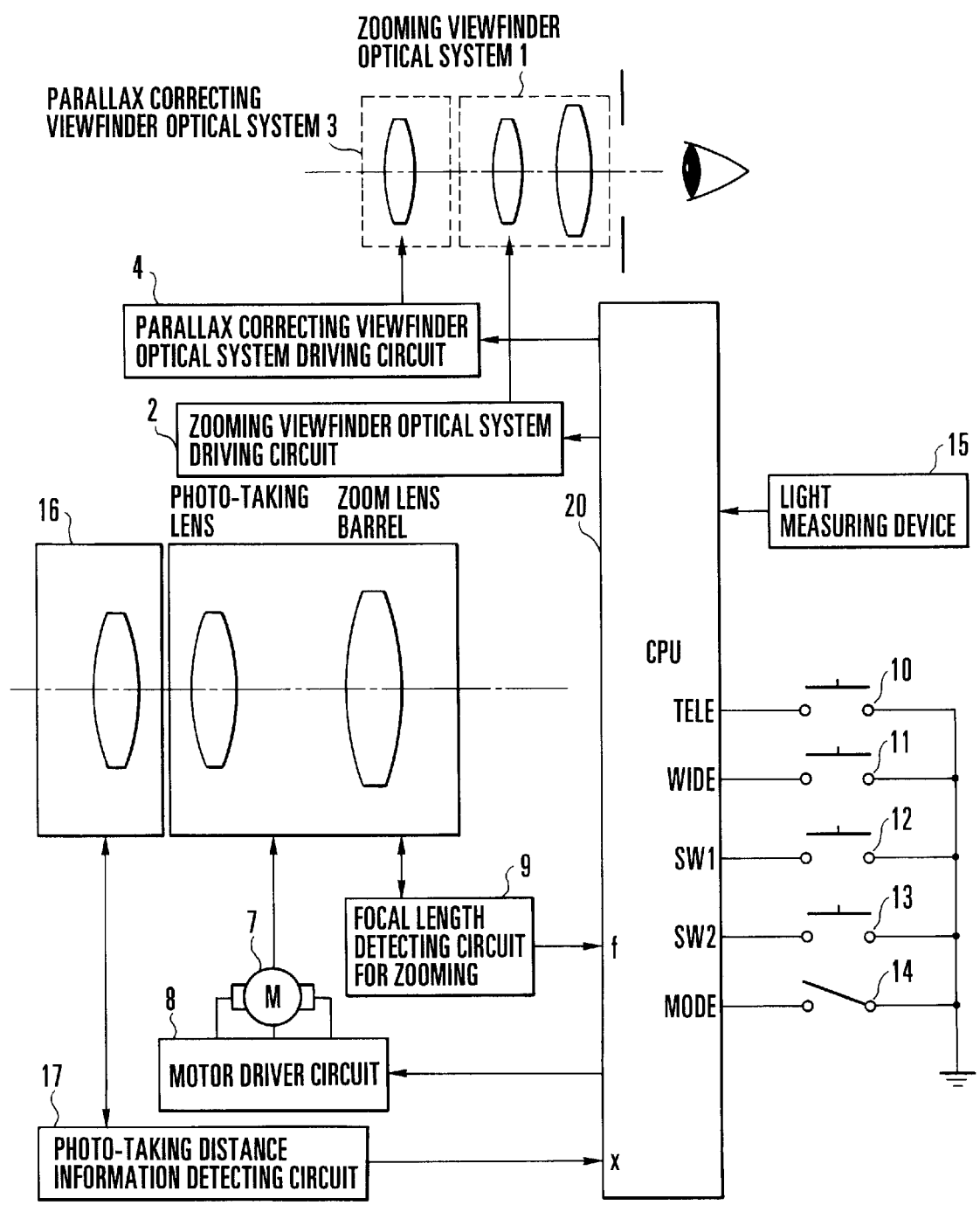
FIG. 8 is a block diagram showing the arrangement of a camera according to a fourth embodiment of this invention.

FIG. 8 is a block diagram showing the arrangement of a camera according to a fourth embodiment of this invention. In FIG. 8, parts that are the same as those of FIG. 1 are indicated by the same reference numerals as in FIG. 1.

The fourth embodiment is arranged to manually adjust the position of a focusing lens 16 and to obtain the photo-taking distance information x by detecting the position of the focusing lens 16 through a photo-taking distance information detecting circuit 17.

Figure 9:
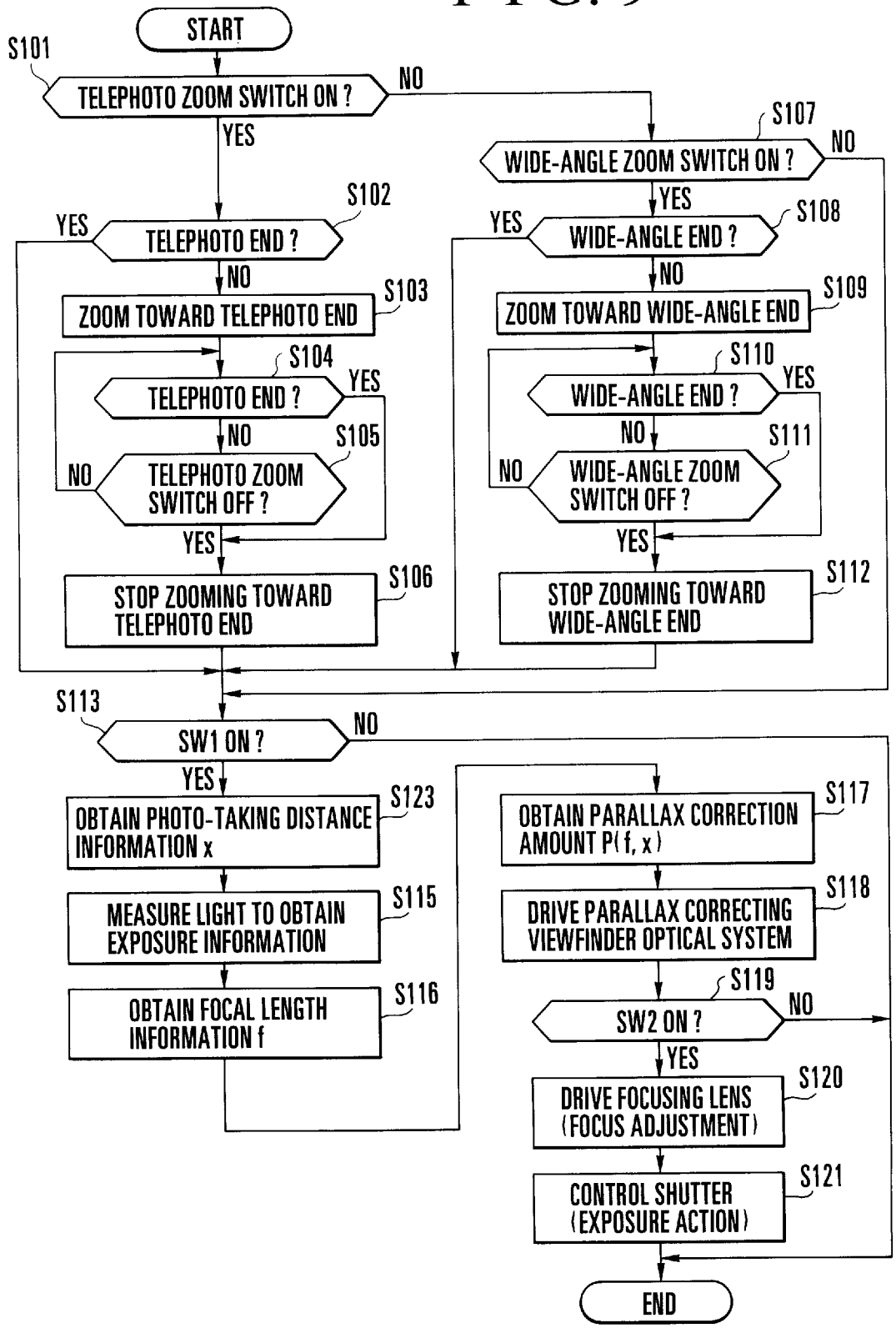
FIG. 9 is a flow chart showing an operation of a microcomputer of the camera shown in FIG. 8.

The fourth embodiment which is arranged in this manner operates as described below with reference to FIG. 9 which is a flow chart showing an operation of the CPU 20. In FIG. 9, steps that are the same as those of FIG. 2 are indicated by the same step numbers as in FIG. 2.

At a step S113 of FIG. 9, when the shutter release button (not shown) is pushed by the operator to the extent of the first stroke, the switch SW1 is turned on. The flow of operation then proceeds to a step S123. At the step S123, the CPU 20 obtains the photo-taking distance information x from the manually adjusted position of the focusing lens 16. At a step S115, the light measuring device 15 is caused to perform a light measuring action to obtain exposure information. At a step S116, the focal length information f of the photo-taking lens barrel 6 is obtained from the focal length detecting circuit 9. The flow then proceeds to a step S117. At the step S117, a parallax correction amount P is computed and obtained on the basis of the focal length information f and the photo-taking distance information x. At a step S118, the CPU 20 causes the driving circuit 4 to drive the parallax correcting viewfinder optical system 3 on the basis of the parallax correction amount P(f,x). The driving action is brought to a stop when the position of the parallax correcting viewfinder optical system 3 reaches the above-stated parallax correction amount P.

As described above, the fourth embodiment is arranged to manually carry out a focusing operation. In the case of the fourth embodiment, therefore, the photo-taking distance information x is obtained from the position of the focusing lens 16 without performing the distance measuring action. The fourth embodiment differs from the first embodiment in this point.

Figure 10:
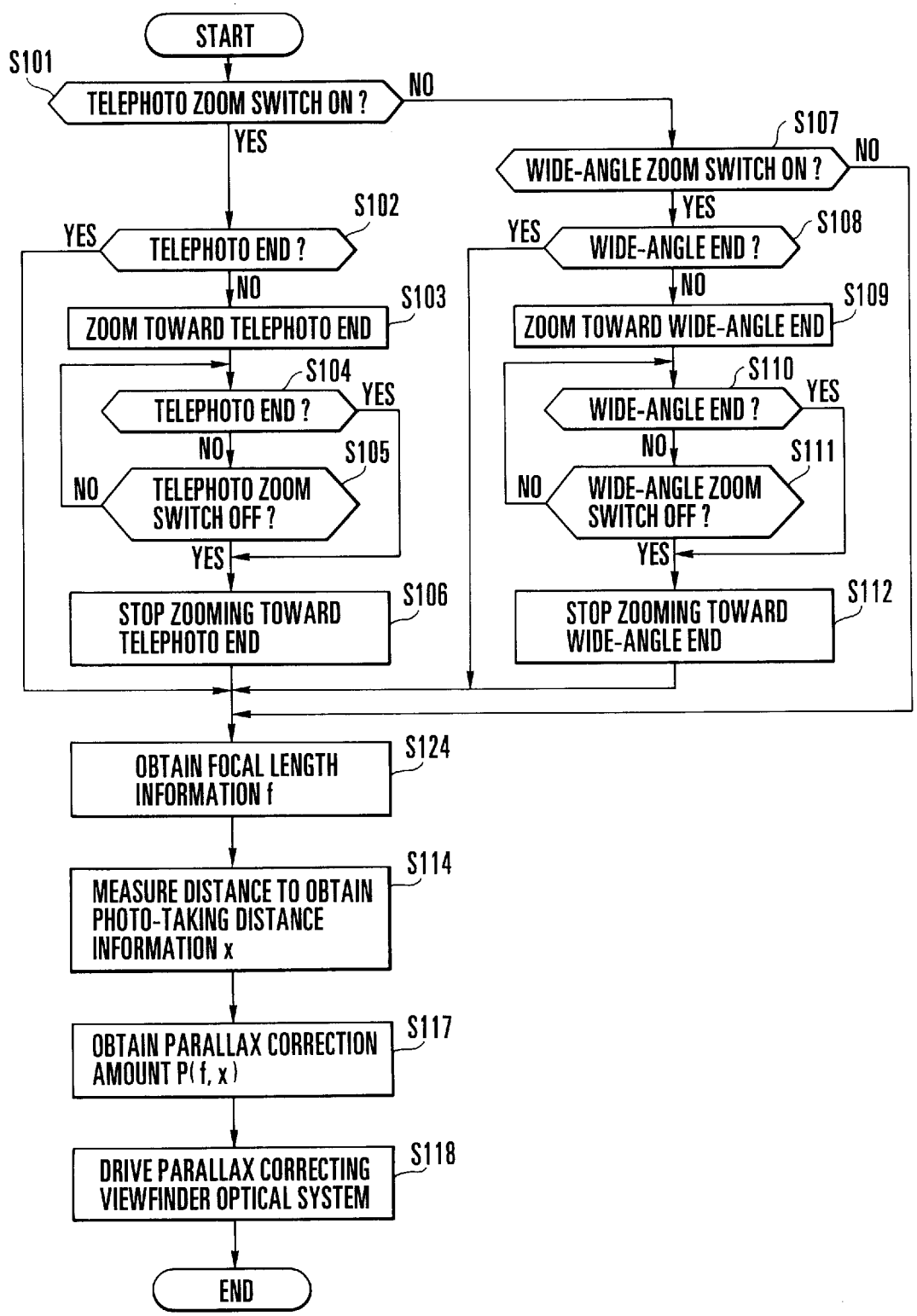
FIG. 10 is a flow chart showing an operation of a microcomputer of the camera shown in FIG. 1 according to a fifth embodiment of this invention.

FIG. 10 is a flow chart showing an operation of the CPU 20 of the camera of FIG. 1 according to a fifth embodiment of this invention. In FIG. 10, all steps that are the same as those of FIG. 2 are indicated by the same step numbers as in FIG. 2.

While each of the embodiments described in the foregoing is arranged to correct a parallax in response to an operation performed on the shutter release button, the fifth embodiment is arranged to automatically make parallax correction upon completion of a zooming operation on the photo-taking optical system, without waiting for an operation on the shutter release button.

Referring to FIG. 10, upon completion of the zooming operation at the step S106 or S112, the flow proceeds to a step S124. At the step S124, the focal length information f is obtained from the focal length detecting circuit 9. The flow then proceeds to the step S114. At the step S114, the distance measuring device 5 is caused to perform its distance measuring action to obtain the photo-taking distance information x.

At the step S117, a parallax correction amount P is computed and obtained on the basis of the focal length information f and the photo-taking distance information x. At a step S118, the driving circuit 4 is caused to drive the parallax correcting viewfinder optical system 3 on the basis of the parallax correction amount P(f,x). The driving action is brought to a stop when the position of the parallax correcting viewfinder optical system 3 reaches the above-stated parallax correction amount P.

According to the arrangement of the fifth embodiment, a parallax correcting action is automatically carried out in response to the termination of the zoom operation of the photo-taking optical system without waiting for an operation on the shutter release button. Therefore, the parallax of the viewfinder can be always adequately corrected even if the shutter release button is not operated, for example, in deciding the image composition of a photograph to be taken. Further, in performing a shutter release operation for photographing, a shutter release time lag can be lessened since the parallax is corrected before the shutter release operation.

In each of the embodiments described above, the viewfinder is provided with a viewfinder optical system for zooming and a viewfinder optical system for parallax correction. Since these viewfinder optical systems are arranged to be driven independently of each other, a parallax can be corrected in an optimum manner for changes both in focal length and in photo-taking distance.

Further, since the arrangement of each of the embodiments described above obviates the necessity of mechanically interlocking a driving mechanism for the zooming viewfinder optical system with the parallax correcting viewfinder optical system which is of the so-called shift type, the viewfinder optical systems can be compactly arranged. It is a general tendency in these days to further reduce the size of compact cameras by imposing severer restrictions on latitude allowed for the designs and layouts of cameras. Hence, the arrangement of each of the embodiments described above allows a great amount of latitude for the layout and design of viewfinder optical systems. It is another advantage of the embodiments described above that the parallax correction is allowed to be independently carried out, thereby permitting selective control in such a way as to have the parallax correcting viewfinder optical system not driven when spending time for driving is not desirable.

The individual components shown in schematic or block form in the drawings are all well-known in the camera arts and their specific construction and operation are not critical to the operation or best mode for carrying out the invention.

While the present invention has been described with respect to what is presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

Each of the embodiments described above is arranged to correct the parallax of the viewfinder by varying the direction of the visual field of the viewfinder. This invention, however, applies also to such a case where the parallax is to be corrected by some other methods, such as by varying a field frame.

In each of the embodiments described above, the quick-shooting photographing mode of the camera is assumed to be a continuous-shooting photographing mode. This invention is, however, not limited to the camera of that type but is applicable to any cameras having other quick-shooting photographing modes, such as a camera which is arranged to adjust the focus of its photo-taking lens beforehand, or other photographing modes.

According to the arrangement of each of the embodiments described above, the parallax correcting action is inhibited under a specific condition, such as in the quick-shooting photographing mode or in the case of having a short focal length. In accordance with this invention, however, this arrangement may be changed to bring the parallax correcting action to a stop or to allow the parallax correcting action to be performed to a certain degree in some controlled manner, instead of completely inhibiting it, even under such a specific condition.

In each of the embodiments described above, a shutter release button is employed. However, this invention is applicable to a camera having any shutter release member other than the shutter release button.

Each of the embodiments described above is arranged on the assumption that the camera has a zooming mode of continuously varying the focal length. However, this invention is applicable also to such a camera that has at least one of a photo-taking optical system and a viewfinder optical system arranged to discontinuously change its focal length.

Further, in each of the embodiments described above, the software arrangement and the hardware arrangement are interchangeable with each other as desired.

This invention may be carried out by combining as necessary the embodiments or their technological elements described in the foregoing.

This invention applies to various cases where either the whole or a part of claims or the arrangement of each embodiment described above forms one apparatus or is used in combination with some other apparatus or as a component element of an apparatus.

This invention is applicable to cameras of varied kinds, such as a lens-shutter type camera, a video camera, etc., optical apparatuses other than cameras, devices adapted for cameras, optical apparatuses and other apparatuses, and component elements forming these apparatuses and devices.

Each of the embodiments described above is arranged to be capable of correcting a parallax in an optimum manner with both the photo-taking distance and the focal length of the photo-taking lens taken into consideration, without necessitating the viewfinder to have a complex structure.

Each of the embodiments described above is arranged to carry out photographing in a manner apposite to situations where spending time for parallax correction is not desired and where it is important to have the parallax corrected in photographing. In other words, photographing can be carried out in different manners according to photographing conditions where the parallax correction is ignorable or where the parallax correction is indispensable.

I claim:

1. A parallax correction apparatus for a viewfinder, comprising:

a) a parallax correcting device which corrects a parallax of a viewfinder;

b) a focal length varying device which varies said viewfinder; and c) a control device which computes a parallax correction signal on the basis of a focusing distance and a focal length of an image forming optical system and controls said parallax correcting device in accordance with the parallex correction signal, said control device controlling said focal length varying device in accordance with the focal length of the image forming optical system, said control device restraining an operation of said parallax correcting device while allowing an operation of said focal length varying device.

2. A parallax correction apparatus for a viewfinder, comprising:

a) a parallax correcting device which corrects a parallax of a viewfinder; and b) a control device which computes a parallax correction signal on the basis of a focusing distance and a focal length of an image forming optical system and controls said parallax correcting device in accordance with the parallax correction signal, said control device restraining said parallax correction device in accordance with selection of a predetermined photographing mode.

3. A parallax correction apparatus for a viewfinder, comprising:

a) a parallax correcting device which corrects a parallax of a viewfinder; and b) a control device which computes a parallax correction signal on the basis of a focusing distance and a focal length of an image forming optical system and controls said parallax correction signal, said control device restraining said parallax correction device in accordance with selection of a predetermined mode.

4. An apparatus according to claim 2, wherein said image forming optical system includes a photo-taking optical system.

5. A parallax correction apparatus for a viewfinder, comprising:

a) a parallax correcting device which corrects a parallax of a viewfinder;

b) a photographing mode selection device which selects a quick-shooting photographing mode; and c) a control device which computes a parallax correction signal on the basis of a focusing distance and a focal length of an image forming optical system and controls said parallax correcting device in accordance with the parallax correction signal, said control device restraining said parallax correcting device in accordance with the quick-shooting photographing mode being selected by said photographing mode selection device.

6. A parallax correction apparatus for a viewfinder, comprising:

a) a parallax correcting device which corrects a parallax of a viewfinder; and b) a control device which computes a parallax correction signal on the basis of a focusing distance and a focal length of an image forming optical system and controls said parallax correcting device in accordance with the parallax correction signal, said control device restraining said parallax correcting device when a combination of the focusing distance and the focal length of the image forming optical system is a predetermined combination.

7. A parallax correction apparatus for a viewfinder, comprising:

a) a parallax correcting device which corrects a parallax of a viewfinder; and b) a control device which computes a parallax correction signal on the basis of a focusing distance and a focal length of an image forming optical system and controls said parallax correcting device in accordance with the parallax correction signal, said control device starting an action of said parallax correcting device in response to an operation of a shutter release member.

8. A parallax correction apparatus for a viewfinder, comprising:

a) a parallax correcting device which corrects a parallax of a viewfinder; and b) a control device which computes a parallax correction signal on the basis of a focusing distance and a focal length of an image forming optical system and controls said parallax correcting device in accordance with the parallax correction signal, said control device starting an action of said parallax correcting device in response to a first stroke operation of a shutter release member.

9. A parallax correction apparatus for a viewfinder, comprising:

a) a parallax correcting device which corrects a parallax of a viewfinder; and b) a control device which computes a parallax correction signal on the basis of a focusing distance and a focal length of an image forming optical system and controls said parallax correcting device in accordance with the parallax correction signal, said control device starting an action of said parallax correcting device in response to completion of a varying operation of the focal length of the image forming optical system.

10. An apparatus according to claim 1, further comprising a focusing distance detecting device which detects the focusing distance of said image forming optical system.

11. An apparatus according to claim 10, wherein said focusing distance detecting device includes a distance measuring device.

12. An apparatus according to claim 10, wherein said focusing distance detecting device includes a state determination device which determines a focusing state of said image forming optical system.

13. An apparatus according to claim 10, further comprising a focal length detecting device which detects the focal length of said image forming optical system.

14. An apparatus according to claim 1, further comprising a focal length detecting device which detects the focal length of said image forming optical system.

15. An apparatus according to claim 14, wherein said focal length detecting device includes a position determination device which determines a position of said image forming optical system.

16. An apparatus according to claim 1, wherein said driving device includes a device which varies a direction of a visual field of said viewfinder.

17. An apparatus according to claim 1, wherein said driving device includes a device which drives a viewfinder optical system which varies a direction of a visual field of said viewfinder.

18. An apparatus according to claim 2, further comprising a focusing distance detecting device which detects the focusing distance of said image forming optical system.

19. An apparatus according to claim 18, wherein said focusing distance detecting device includes a distance measuring device.

20. An apparatus according to claim 18, wherein said focusing distance detecting device includes a state determination device which determines a focusing state of said image forming optical system.

21. An apparatus according to claim 18, further comprising a focal length detecting device which detects the focal length of said image forming optical system.

22. An apparatus according to claim 18, further comprising a focal length detecting device which detects the focal length of said image forming optical system.

23. An apparatus according to claim 22, wherein said focal length detecting device includes a position determination device which determines a position of said image forming optical system.

24. An apparatus according to claim 18, wherein said driving device includes a device which varies a direction of a visual field of said viewfinder.

25. An apparatus according to claim 18, wherein said driving device includes a device which drives a viewfinder optical system which varies a direction of a visual field of said viewfinder.

26. An apparatus according to claim 3, further comprising a focusing distance detecting device which detects the focusing distance of said image forming optical system.

27. An apparatus according to claim 26, wherein said focusing distance detecting device includes a distance measuring device.

28. An apparatus according to claim 26, wherein said focusing distance detecting device includes a state determination device which determines a focusing state of said image forming optical system.

29. An apparatus according to claim 26, further comprising a focal length detecting device which detects the focal length of said image forming optical system.

30. An apparatus according to claim 3, further comprising a focal length detecting device which detects the focal length of said image forming optical system.

31. An apparatus according to claim 30, wherein said focal length detecting device includes a position determination device which determines a position of said image forming optical system.

32. An apparatus according to claim 3, wherein said driving device includes a device which varies a direction of a visual field of said viewfinder.

33. An apparatus according to claim 3, wherein said driving device includes a device which drives a viewfinder optical system which varies a direction of a visual field of said viewfinder.

34. An apparatus according to claim 5, further comprising a focusing distance detecting device which detects the focusing distance of said image forming optical system.

35. An apparatus according to claim 34, wherein said focusing distance detecting device includes a distance measuring device.

36. An apparatus according to claim 34, wherein said focusing distance detecting device includes a state determination device which determines a focusing state of said image forming optical system.

37. An apparatus according to claim 34, further comprising a focal length detecting device which detects the focal length of said image forming optical system.

38. An apparatus according to claim 5, further comprising a focal length detecting device which detects the focal length of said image forming optical system.

39. An apparatus according to claim 38, wherein said focal length detecting device includes a position determination device which determines a position of said image forming optical system.

40. An apparatus according to claim 5, wherein said driving device includes a device which varies a direction of a visual field of said viewfinder.

41. An apparatus according to claim 5, wherein said driving device includes a device which drives a viewfinder optical system which varies a direction of a visual field of said viewfinder.

42. An apparatus according to claim 6, further comprising a focusing distance detecting device which detects the focusing distance of said image forming optical system.

43. An apparatus according to claim 42, wherein said focusing distance detecting device includes a distance measuring device.

44. An apparatus according to claim 42, wherein said focusing distance detecting device includes a state determination device which determines a focusing state of said image forming optical system.

45. An apparatus according to claim 42, further comprising a focal length detecting device which detects the focal length of said image forming optical system.

46. An apparatus according to claim 6, further comprising a focal length detecting device which detects the focal length of said image forming optical system.

47. An apparatus according to claim 46, wherein said focal length detecting device includes a position determination device which determines a position of said image forming optical system.

48. An apparatus according to claim 6, wherein said driving device includes a device which varies a direction of a visual field of said viewfinder.

49. An apparatus according to claim 6, wherein said driving device includes a device which drives a viewfinder optical system which varies a direction of a visual field of said viewfinder.

50. An apparatus according to claim 7, further comprising a focusing distance detecting device which detects the focusing distance of said image forming optical system.

51. An apparatus according to claim 50, wherein said focusing distance detecting device includes a distance measuring device.

52. An apparatus according to claim 50, wherein said focusing distance detecting device includes a state determination device which determines a focusing state of said image forming optical system.

53. An apparatus according to claim 50, further comprising a focal length detecting device which detects the focal length of said image forming optical system.

54. An apparatus according to claim 7, further comprising a focal length detecting device which detects the focal length of said image forming optical system.

55. An apparatus according to claim 54, wherein said focal length detecting device includes a position determination device which determines a position of said image forming optical system.

56. An apparatus according to claim 7, wherein said driving device includes a device which varies a direction of a visual field of said viewfinder.

57. An apparatus according to claim 7, wherein said driving device includes a device which drives a viewfinder optical system which varies a direction of a visual field of said viewfinder.

58. An apparatus according to claim 8, further comprising a focusing distance detecting device which detects the focusing distance of said image forming optical system.

59. An apparatus according to claim 58, wherein said focusing distance detecting device includes a distance measuring device.

60. An apparatus according to claim 58, wherein said focusing distance detecting device includes a state determination device which determines a focusing state of said image forming optical system.

61. An apparatus according to claim 58, further comprising a focal length detecting device which detects the focal length of said image forming optical system.

62. An apparatus according to claim 8, further comprising a focal length detecting device which detects the focal length of said image forming optical system.

63. An apparatus according to claim 62, wherein said focal length detecting device includes a position determination device which determines a position of said image forming optical system.

64. An apparatus according to claim 8, wherein said driving device includes a device which varies a direction of a visual field of said viewfinder.

65. An apparatus according to claim 8, wherein said driving device includes a device which drives a viewfinder optical system which varies a direction of a visual field of said viewfinder.

66. An apparatus according to claim 9, further comprising a focusing distance detecting device which detects the focusing distance of said image forming optical system.

67. An apparatus according to claim 66, wherein said focusing distance detecting device includes a distance measuring device.

68. An apparatus according to claim 66, wherein said focusing distance detecting device includes a state determination device which determines a focusing state of said image forming optical system.

69. An apparatus according to claim 66, further comprising a focal length detecting device which detects the focal length of said image forming optical system.

70. An apparatus according to claim 9, further comprising a focal length detecting device which detects the focal length of said image forming optical system.

71. An apparatus according to claim 70, wherein said focal length detecting device includes a position determination device which determines a position of said image forming optical system.

72. An apparatus according to claim 9, wherein said driving device includes a device which varies a direction of a visual field of said viewfinder.

73. An apparatus according to claim 9, wherein said driving device includes a device which drives a viewfinder optical system which varies a direction of a visual field of said viewfinder.

74. An apparatus according to claim 1, wherein said control device includes a computing circuit.

75. An apparatus according to claim 74, wherein said computing circuit includes a table for deriving a result of a computing operation.

76. An apparatus according to claim 2, wherein said control device includes a computing circuit.

77. An apparatus according to claim 76, wherein said computing circuit includes a table for deriving a result of a computing operation.

78. An apparatus according to claim 3, wherein said control device includes a computing circuit.

79. An apparatus according to claim 78, wherein said computing circuit includes a table for deriving a result of a computing operation.

80. An apparatus according to claim 5, wherein said control device includes a computing circuit.

81. An apparatus according to claim 80, wherein said computing circuit includes a table for deriving a result of a computing operation.

82. An apparatus according to claim 6, wherein said control device includes a computing circuit.

83. An apparatus according to claim 82, wherein said computing circuit includes a table for deriving a result of a computing operation.

84. An apparatus according to claim 7, wherein said control device includes a computing circuit.

85. An apparatus according to claim 84, wherein said computing circuit includes a table for deriving a result of a computing operation.

86. An apparatus according to claim 8, wherein said control device includes a computing circuit.

87. An apparatus according to claim 86, wherein said computing circuit includes a table for deriving a result of a computing operation.

88. An apparatus according to claim 9, wherein said control device includes a computing circuit.

89. An apparatus according to claim 88, wherein said computing circuit includes a table for deriving a result of a computing operation.

90. An apparatus according to claim 1, wherein said control device includes a motor.

91. An apparatus according to claim 1, wherein said parallax correction apparatus includes said image forming optical system.

92. An apparatus according to claim 91, wherein said parallax correction apparatus includes said viewfinder.

93. An apparatus according to claim 1, wherein said parallax correction apparatus includes said viewfinder.

94. An apparatus according to claim 2, wherein said control device includes a motor.

95. An apparatus according to claim 2, wherein said parallax correction apparatus includes said image forming optical system.

96. An apparatus according to claim 95, wherein said parallax correction apparatus includes said viewfinder.

97. An apparatus according to claim 2, wherein said parallax correction apparatus includes said viewfinder.

98. An apparatus according to claim 3, wherein said control device includes a motor.

99. An apparatus according to claim 3, wherein said parallax correction apparatus includes said image forming optical system.

100. An apparatus according to claim 99, wherein said parallax correction apparatus includes said viewfinder.

101. An apparatus according to claim 3, wherein said parallax correction apparatus includes said viewfinder.

102. An apparatus according to claim 5, wherein said control device includes a motor.

103. An apparatus according to claim 5, wherein said parallax correction apparatus includes said image forming optical system.

104. An apparatus according to claim 103, wherein said parallax correction apparatus includes said viewfinder.

105. An apparatus according to claim 6, wherein said control device includes a motor.

106. An apparatus according to claim 6, wherein said parallax correction apparatus includes said image forming optical system.

107. An apparatus according to claim 106, wherein said parallax correction apparatus includes said viewfinder.

108. An apparatus according to claim 6, wherein said parallax correction apparatus includes said viewfinder.

109. An apparatus according to claim 7, wherein said control device includes a motor.

110. An apparatus according to claim 7, wherein said parallax correction apparatus includes said image forming optical system.

111. An apparatus according to claim 110, wherein said parallax correction apparatus includes said viewfinder.

112. An apparatus according to claim 7, wherein said parallax correction apparatus includes said viewfinder.

113. An apparatus according to claim 8, wherein said control device includes a motor.

114. An apparatus according to claim 8, wherein said parallax correction apparatus includes said image forming optical system.

115. An apparatus according to claim 114, wherein said parallax correction apparatus includes said viewfinder.

116. An apparatus according to claim 8, wherein said parallax correction apparatus includes said viewfinder.

117. An apparatus according to claim 9, wherein said control device includes a motor.

118. An apparatus according to claim 9, wherein said parallax correction apparatus includes said image forming optical system.

119. An apparatus according to claim 118, wherein said parallax correction apparatus includes said viewfinder.

120. An apparatus according to claim 9, wherein said parallax correction apparatus includes said viewfinder.

121. An optical apparatus comprising:
a) a parallax correcting device which corrects a parallax of a viewfinder;
b) a focal length varying device which varies said viewfinder; and
c) a control device which computes a parallax correction signal on the basis of a focusing distance and a focal length of an image forming optical system and controls said parallax correcting device controlling said focal length varying device in accordance with the focal length of the image forming optical system, said control device restraining an operation of said parallax correcting device while allowing an operation of said focal length varying device.

122. An optical apparatus comprising:
a) a parallax correcting device which corrects a parallax of a viewfinder; and
b) a control device which computes a parallax correction signal on the basis of a focusing distance and a focal length of an image forming optical system and controls said parallax correcting device in accordance with the parallax correction signal, said control device restraining said parallax correction device in accordance with selection of a predetermined photographing mode.

123. An optical apparatus comprising:
a) a parallax correcting device which corrects a parallax of a viewfinder; and
b) a control device which computes a parallax correction signal on the basis of a focusing distance and a focal length of an image forming optical system and controls said parallax correction signal, said control device restraining said parallax correction device in accordance with selection of a predetermined mode.

124. An apparatus according to claim 5, wherein said parallax correction apparatus includes said viewfinder.

125. An optical apparatus according to claim 122, wherein said image forming optical system includes a photo-taking optical system.

126. An optical apparatus comprising:
a) a parallax correcting device which corrects a parallax of a viewfinder;
b) a photographing mode selection device which selects a quick-shooting photographing mode; and
c) a control device which computes a parallax correction signal on the basis of a focusing distance and a focal length of an image forming optical system and controls said parallax correcting device in accordance with the parallax correction signal, said control device restraining said parallax correcting device in accordance with the quick-shooting photographing mode being selected by said photographing mode selection device.

127. An optical apparatus comprising:
a) a parallax correcting device which corrects a parallax of a viewfinder; and
b) a control device which computes a parallax correction signal on the basis of a focusing distance and a focal length of an image forming optical system and controls said parallax correcting device in accordance with the parallax correction signal, said control device restraining said parallax correcting device when a combination of the focusing distance and the focal length of the image forming optical system is a predetermined combination.

128. An optical apparatus comprising:
a) a parallax correcting device which corrects a parallax of a viewfinder; and
b) a control device which computes a parallax correction signal on the basis of a focusing distance and a focal length of an image forming optical system and controls said parallax correcting device in accordance with the parallax correction signal, said control device starting an action of said parallax correcting device in response to an operation of a shutter release member.

129. An optical apparatus comprising:
a) a parallax correcting device which corrects a parallax of a viewfinder; and
b) a control device which computes a parallax correction signal on the basis of a focusing distance and a focal length of an image forming optical system and controls said parallax correcting device in accordance with the parallax correction signal, said control device starting an action of said parallax correcting device in response to a first stroke operation of a shutter release member.

130. An optical apparatus comprising:
a) a parallax correcting device which corrects a parallax of a viewfinder; and
b) a control device which computes a parallax correction signal on the basis of a focusing distance and a focal length of an image forming optical system and controls said parallax correcting device in accordance with the parallax correction signal, said control device starting an action of said parallax correcting device in response to completion of a varying operation of the focal length of the image forming optical system.

131. An apparatus according to claim 121, further comprising a focusing distance detecting device which detects the focusing distance of said image forming optical system.

132. An apparatus according to claim 122, further comprising a focusing distance detecting device which detects the focusing distance of said image forming optical system.

133. An apparatus according to claim 123, further comprising a focusing distance detecting device which detects the focusing distance of said image forming optical system.

134. An apparatus according to claim 126, further comprising a focusing distance detecting device which detects the focusing distance of said image forming optical system.

135. An apparatus according to claim 127, further comprising a focusing distance detecting device which detects the focusing distance of said image forming optical system.

136. An apparatus according to claim 128, further comprising a focusing distance detecting device which detects the focusing distance of said image forming optical system.

137. An apparatus according to claim 129, further comprising a focusing distance detecting device which detects the focusing distance of said image forming optical system.

138. An apparatus according to claim 130, further comprising a focusing distance detecting device which detects the focusing distance of said image forming optical system.

139. An apparatus according to claim 121, wherein said control device includes a computing circuit.

140. An apparatus according to claim 123, wherein said control device includes a computing circuit.

141. An apparatus according to claim 126, wherein said control device includes a computing circuit.

142. An apparatus according to claim 127, wherein said control device includes a computing circuit.

143. An apparatus according to claim 128, wherein said control device includes a computing circuit.

144. An apparatus according to claim 129, wherein said control device includes a computing circuit.

145. An apparatus according to claim 130, wherein said control device includes a computing circuit.

146. An apparatus according to claim 121, wherein said control device includes a motor.

147. An apparatus according to claim 121, wherein said parallax correction apparatus includes said image forming optical system.

148. An apparatus according to claim 121, wherein said parallax correction apparatus includes said viewfinder.

149. An apparatus according to claim 122, wherein said control device includes a motor.

150. An apparatus according to claim 122, wherein said parallax correction apparatus includes said image forming optical system.

151. An apparatus according to claim 122, wherein said parallax correction apparatus includes said viewfinder.

152. An apparatus according to claim 123, wherein said control device includes a motor.

153. An apparatus according to claim 123, wherein said parallax correction apparatus includes said image forming optical system.

154. An apparatus according to claim 123, wherein said parallax correction apparatus includes said viewfinder.

155. An apparatus according to claim 126, wherein said control device includes a motor.

156. An apparatus according to claim 126, wherein said parallax correction apparatus includes said image forming optical system.

157. An apparatus according to claim 126, wherein said parallax correction apparatus includes said viewfinder.

158. An apparatus according to claim 127, wherein said control device includes a motor.

159. An apparatus according to claim 127, wherein said parallax correction apparatus includes said image forming optical system.

160. An apparatus according to claim 127, wherein said parallax correction apparatus includes said viewfinder.

161. An apparatus according to claim 128, wherein said control device includes a motor.

162. An apparatus according to claim 128, wherein said parallax correction apparatus includes said image forming optical system.

163. An apparatus according to claim 128, wherein said parallax correction apparatus includes said viewfinder.

164. An apparatus according to claim 129, wherein said control device includes a motor.

165. An apparatus according to claim 129, wherein said parallax correction apparatus includes said image forming optical system.

166. An apparatus according to claim 129, wherein said parallax correction apparatus includes said viewfinder.

167. An apparatus according to claim 130, wherein said control device includes a motor.

168. An apparatus according to claim 130, wherein said parallax correction apparatus includes said image forming optical system.

169. A camera comprising:
  a) a parallax correcting device which corrects a parallax of a viewfinder;
  b) a focal length varying device which varies said viewfinder; and
  c) a control device which computes a parallax correction signal on the basis of a focusing distance and a focal length of an image forming optical system and controls said parallax correcting device controlling said focal length varying device in accordance with the focal length of the image forming optical system, said control device restraining an operation of said parallax correcting device while allowing an operation of said focal length varying device.

170. A camera comprising:
  a) a parallax correcting device which corrects a parallax of a viewfinder; and
  b) a control device which computes a parallax correction signal on the basis of a focusing distance and a focal length of an image forming optical system and controls said parallax correcting device in accordance with the parallax correction signal, said control device restraining said parallax correction device in accordance with selection of a predetermined photographing mode.

171. A camera comprising:
  a) a parallax correcting device which corrects a parallax of a viewfinder; and
  b) a control device which computes a parallax correction signal on the basis of a focusing distance and a focal length of an image forming optical system and controls said parallax correction signal, said control device restraining said parallax correction device in accordance with selection of a predetermined mode.

172. A camera according to claim 170, wherein said image forming optical system includes a photo-taking optical system.

173. A camera comprising:
  a) a parallax correcting device which corrects a parallax of a viewfinder;
  b) a photographing mode selection device which selects a quick-shooting photographing mode; and
  c) a control device which computes a parallax correction signal on the basis of a focusing distance and a focal length of an image forming optical system and controls said parallax correcting device in accordance with the parallax correction signal, said control device restraining said parallax correcting device in accordance with the quick-shooting photographing mode being selected by said photographing mode selection device.

174. A camera comprising:
  a) a parallax correcting device which corrects a parallax of a viewfinder; and
  b) a control device which computes a parallax correction signal on the basis of a focusing distance and a focal length of an image forming optical system and controls said parallax correcting device in accordance with the parallax correction signal, said control device restraining said parallax correcting device when a combination of the focusing distance and the focal length of the image forming optical system is a predetermined combination.

175. A camera comprising:
  a) a parallax correcting device which corrects a parallax of a viewfinder; and
  b) a control device which computes a parallax correction signal on the basis of a focusing distance and a focal length of an image forming optical system and controls said parallax correcting device in accordance with the parallax correction signal, said control device starting an action of said parallax correcting device in response to an operation of a shutter release member.

176. A camera comprising:
  a) a parallax correcting device which corrects a parallax of a viewfinder; and
  b) a control device which computes a parallax correction signal on the basis of a focusing distance and a focal length of an image forming optical system and controls said parallax correcting device in accordance with the parallax correction signal, said control device starting an action of said parallax correcting device in response to a first stroke operation of a shutter release member.

177. A camera comprising:
  a) a parallax correcting device which corrects a parallax of a viewfinder; and
  b) a control device which computes a parallax correction signal on the basis of a focusing distance and a focal length of an image forming optical system and controls said parallax correcting device in accordance with the parallax correction signal, said control device starting an action of said parallax correcting device in response to completion of a varying operation of the focal length of the image forming optical system.

178. A camera according to claim 169, further comprising a focusing distance detecting device which detects the focusing distance of said image forming optical system.

179. A camera according to claim 170, further comprising a focusing distance detecting device which detects the focusing distance of said image forming optical system.

180. A camera according to claim 171, further comprising a focusing distance detecting device which detects the focusing distance of said image forming optical system.

181. A camera according to claim 173, further comprising a focusing distance detecting device which detects the focusing distance of said image forming optical system.

182. A camera according to claim 174, further comprising a focusing distance detecting device which detects the focusing distance of said image forming optical system.

183. A camera according to claim 174, further comprising a focal length detecting device which detects the focal length of said image forming optical system.

184. A camera according to claim 174, further comprising a focal length detecting device which detects the focal length of said image forming optical system.

185. A camera according to claim 174, wherein said driving device includes a device which drives a viewfinder optical system which varies a direction of a visual field of said viewfinder.

186. A camera according to claim 174, further comprising a focusing distance detecting device which detects the focusing distance of said image forming optical system.

187. A camera according to claim 174, wherein said focusing distance detecting device includes a state determination device which determines a focusing state of said image forming optical system.

188. A camera according to claim 174, further comprising a focal length detecting device which detects the focal length of said image forming optical system.

189. A camera according to claim 174, further comprising a focal length detecting device which detects the focal length of said image forming optical system.

190. A camera according to claim 174, wherein said driving device includes a device which varies a direction of a visual field of said viewfinder.

191. A camera according to claim 174, wherein said driving device includes a device which drives a viewfinder optical system which varies a direction of a visual field of said viewfinder.

192. A camera according to claim 175, further comprising a focusing distance detecting device which detects the focusing distance of said image forming optical system.

193. A camera according to claim 176, further comprising a focusing distance detecting device which detects the focusing distance of said image forming optical system.

194. A camera according to claim 169, wherein said control device includes a computing circuit.

195. A camera according to claim 170, wherein said control device includes a computing circuit.

196. A camera according to claim 171, wherein said control device includes a computing circuit.

197. A camera according to claim 173, wherein said control device includes a computing circuit.

198. A camera according to claim 174, wherein said control device includes a computing circuit.

199. A camera according to claim 175, wherein said control device includes a computing circuit.

200. A camera according to claim 176, wherein said control device includes a computing circuit.

201. A camera according to claim 177, wherein said control device includes a computing circuit.

202. A camera according to claim 169, wherein said control device includes a motor.

203. A camera according to claim 169, wherein said parallax correction camera includes said viewfinder.

204. A camera according to claim 170, wherein said control device includes a motor.

205. A camera according to claim 170, wherein said parallax correction camera includes said image forming optical system.

206. A camera according to claim 170, wherein said parallax correction camera includes said viewfinder.

207. A camera according to claim 171, wherein said control device includes a motor.

208. A camera according to claim 171, wherein said parallax correction camera includes said image forming optical system.

209. A camera according to claim 171, wherein said parallax correction camera includes said viewfinder.

210. A camera according to claim 173, wherein said control device includes a motor.

211. A camera according to claim 173, wherein said parallax correction camera includes said image forming optical system.

212. A camera according to claim 173, wherein said parallax correction camera includes said viewfinder.

213. A camera according to claim 174, wherein said control device includes a motor.

214. A camera according to claim 174, wherein said parallax correction camera includes said viewfinder.

215. A camera according to claim 175, wherein said parallax correction camera includes said viewfinder.

216. A camera according to claim 175, wherein said control device includes a motor.

217. A camera according to claim 175, wherein said parallax correction camera includes said image forming optical system.

218. A camera according to claim 175, wherein said parallax correction camera includes said viewfinder.

219. A camera according to claim 176, wherein said control device includes a motor.

220. A camera according to claim 176, wherein said parallax correction camera includes said image forming optical system.

221. A camera according to claim 176, wherein said parallax correction camera includes said viewfinder.

222. A camera according to claim 177, wherein said control device includes a motor.

223. A camera according to claim 177, wherein said parallax correction camera includes said image forming optical system.

224. A camera according to claim 177, wherein said parallax correction camera includes said viewfinder.

225. An apparatus according to claim 130, wherein said parallax correction apparatus includes said viewfinder.

226. An apparatus according to claim 122, wherein said control device includes a computing circuit.

227. A camera according to claim 174, wherein said driving device includes a device which varies a direction of a visual field of said viewfinder.

228. A camera according to claim 169, wherein said parallax correction camera includes said image forming optical system.

* * * * *

UNITED STATES PATENT AND TRADEMARK OFFICE
CERTIFICATE OF CORRECTION

PATENT NO. : 5,815,746
DATED : September 29, 1998
INVENTOR(S) : Hidetoshi Masuda It is certified that error appears in the above-identified patent and that said Letters Patent is hereby corrected as shown below:

<u>Title page,</u>
Column 1, after item [22] insert [30]Foreign Application Priority Data
Jan.31, 1996 [JP] Japan................8-035774
Jan 24, 1996 [JP] Japan................8-162929

Signed and Sealed this

Twenty-first Day of August, 2001

*Attest:*

Nicholas P. Godici

NICHOLAS P. GODICI
*Attesting Officer*    *Acting Director of the United States Patent and Trademark Office*